(12) United States Patent
Kynast et al.

(10) Patent No.: US 7,216,022 B2
(45) Date of Patent: May 8, 2007

(54) METHOD AND DEVICE FOR OPERATING DRIVER INFORMATION SYSTEMS

(75) Inventors: Andreas Kynast, Hildesheim (DE); Jens Faenger, Bernburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/517,514

(22) PCT Filed: May 20, 2003

(86) PCT No.: PCT/DE03/01622

§ 371 (c)(1),
(2), (4) Date: Jun. 21, 2005

(87) PCT Pub. No.: WO2004/002770

PCT Pub. Date: Jan. 8, 2004

(65) Prior Publication Data

US 2006/0015219 A1    Jan. 19, 2006

(30) Foreign Application Priority Data

Jun. 27, 2002    (DE) ............... 102 28 703

(51) Int. Cl.
G05D 1/00    (2006.01)

(52) U.S. Cl. ............... 701/1; 701/36; 701/117

(58) Field of Classification Search ............ 701/1, 701/25, 36, 33, 117, 118, 202, 203, 208, 211, 701/213; 342/357.1–357.13; 340/902, 905, 340/936, 933, 539
See application file for complete search history.

(56) References Cited

U.S. PATENT DOCUMENTS

| 6,163,277 | A | 12/2000 | Gehlot |
| 6,622,087 | B2 * | 9/2003 | Anderson ............... 701/209 |
| 6,707,421 | B1 * | 3/2004 | Drury et al. ............ 342/357.1 |
| 6,714,894 | B1 * | 3/2004 | Tobey et al. ............ 702/188 |
| 6,728,605 | B2 * | 4/2004 | Lash et al. ............... 701/1 |
| 6,812,888 | B2 * | 11/2004 | Drury et al. ........... 342/357.13 |
| 6,931,309 | B2 * | 8/2005 | Phelan et al. ............. 701/1 |
| 6,988,031 | B2 * | 1/2006 | McDonald et al. ......... 701/112 |

FOREIGN PATENT DOCUMENTS

WO    WO 99 28145    6/1999

* cited by examiner

Primary Examiner—Richard M. Camby
(74) Attorney, Agent, or Firm—Kenyon & Kenyon LLP

(57) ABSTRACT

The present invention provides a method for operating information systems for providing information to a driver in a motor vehicle, via which method increased driving safety may be obtained. In accordance with the present invention, the information to be output to the driver is selected as a function of vehicle operating data, so that the driver is provided with select information adapted to the particular driving situation, without the driver being unnecessarily distracted from the main task of driving the vehicle.

18 Claims, 2 Drawing Sheets

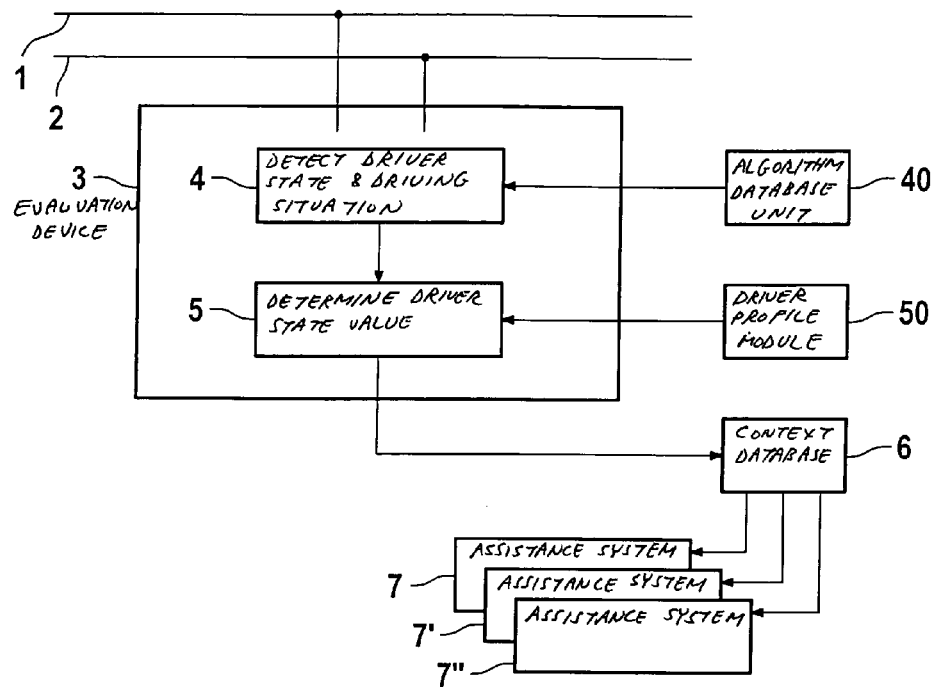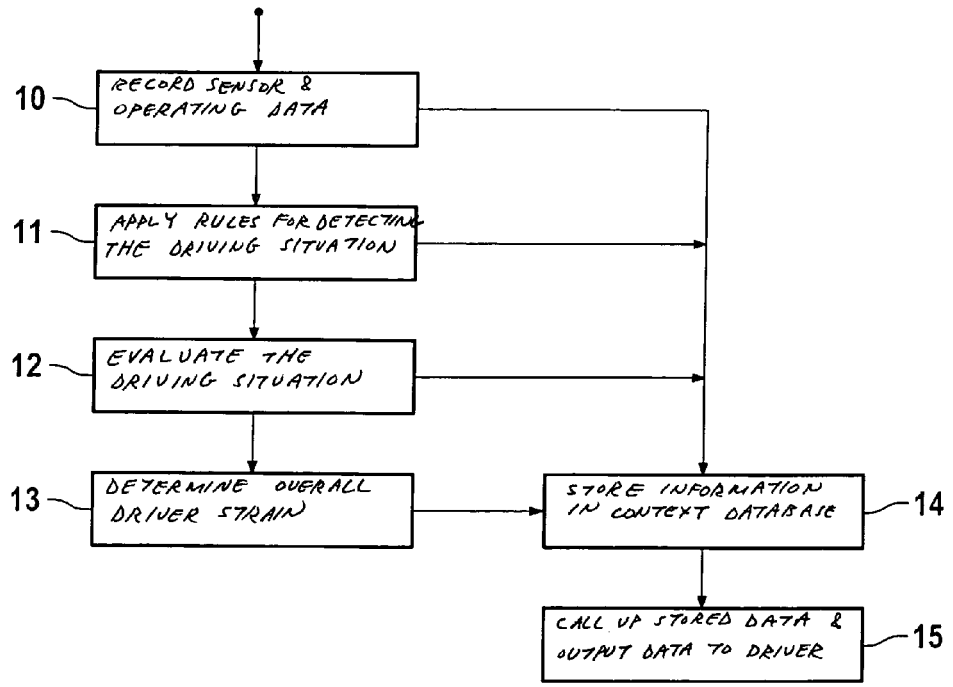

METHOD AND DEVICE FOR OPERATING DRIVER INFORMATION SYSTEMS

FIELD OF THE INVENTION

The present invention relates to a method for operating information systems for a driver in a motor vehicle, as well as a device for carrying out such a method.

BACKGROUND INFORMATION

In motor vehicles, there are various systems that provide the driver with information, e.g., a navigation system, the customary control displays, or an entertainment system, which displays, for example, received radio stations, the volume, or the like. Information may be provided to the driver independently of the current driving situation, i.e., the driver information systems continue operation in a one-time set mode.

In this regard, in driving situations in which the driver is required to dedicate greater attention to the operating of the vehicle, information output at an inappropriate time may result in an undesired distraction, thereby putting the traffic participants at risk.

The object of the present invention is to provide a method for operating information systems for a driver in a motor vehicle, and also provide a device for carrying out a method via which increased driving safety may be achieved.

SUMMARY

According to the present invention, this objective is achieved in that the information to be output to the driver is selected as a function of the vehicle operating data so that the driver is provided with select information adapted to the driving situation without the driver being unnecessarily distracted for the actual task, namely driving the vehicle.

The information to be output to the driver is advantageously selected with respect to the information type, the information representation, or the information density. The information type relates first and foremost to the information content, i.e., the area of origin of the information to be output, e.g., entertainment area, vehicle operating data, or telecommunications area. The information representation relates to the manner in which information is communicated, in this instance in particular to the selection regarding the acoustic and/or visual provision of the information and the representation quality of the information. Quality differences may relate, for example, to the brightness or size of the representation or to the volume of acoustically provided information. The information density relates to the amount of information transmitted to the driver per time unit, i.e., a lower information density is provided during phases requiring increased concentration than during relaxed driving on dry roads during the day.

An advantageous example embodiment of the present invention provides for a driver profile to be created that takes each driver's information absorption capacity into consideration. The driver profile is advantageously created under consideration and as a function of the vehicle operating data following completed driver identification. During driver identification, physiological data, such as age, body size, weight, sight capability, or reaction time, is recorded, and the recorded vehicle operating data is used to determine how much information of a certain type is transmitted to a driver in a specific driving situation.

The driver profile is advantageously automatically updated over the period of use on the basis of the vehicle operating data so that it may be determined on the basis of a correlation between the existing driver profile and the vehicle operating data, e.g., in connection with environmental data, that a driver drives significantly slower in the dark than is actually necessary, so that it may be concluded that this driver requires greater concentration in the dark to operate the vehicle and that a lower information density should therefore be provided.

In addition to the vehicle operating data, information may result from available location data determined for example by a GPS system, the available time or time of year, additional stored environmental information, e.g. an increased danger of black ice, or navigational data, so that a lower information density is provided when driving in a city than on a highway, for example.

A further criterion for the selection of the information to be output is the present traffic data that causes or suppresses a selection of corresponding information based on existing traffic jams, danger areas, or the like, for example. Therefore, for example, a hierarchy may be created within the information to be output so that in the case of high traffic density or an expected traffic jam, traffic information is given priority over a region change of a radio station, for example.

The data, in particular the vehicle condition data, is recorded by sensors and supplied to a computer unit that makes an appropriate assignment based on available algorithms and selects or suppresses the corresponding information or determines the manner, the sequence, and the type of the information.

A further example embodiment of the present invention provides for a value for the driver state to be determined from the acquired data and the driver profile. This value is stored in a context database that is connected to assistance systems. Assistance systems support the driver in operating the vehicle and provide the driver with appropriate information. A strategy enabling the situation-specific output of information via the assistance systems is determined on the basis of the acquired data in connection with the driver profile. Therefore, strategies for the operation of these assistance systems are developed, which means in concrete terms that different assistance systems are temporarily switched off or the information that usually follows a fixed schema is output in a situation-specific manner.

BRIEF DESCRIPTION OF THE DRAWINGS

FIG. 1 shows a diagram of an example embodiment of a system for evaluating a driver state.

FIG. 2 shows a flowchart of an example embodiment of a method for detecting the driver state.

DETAILED DESCRIPTION

Figure 3:
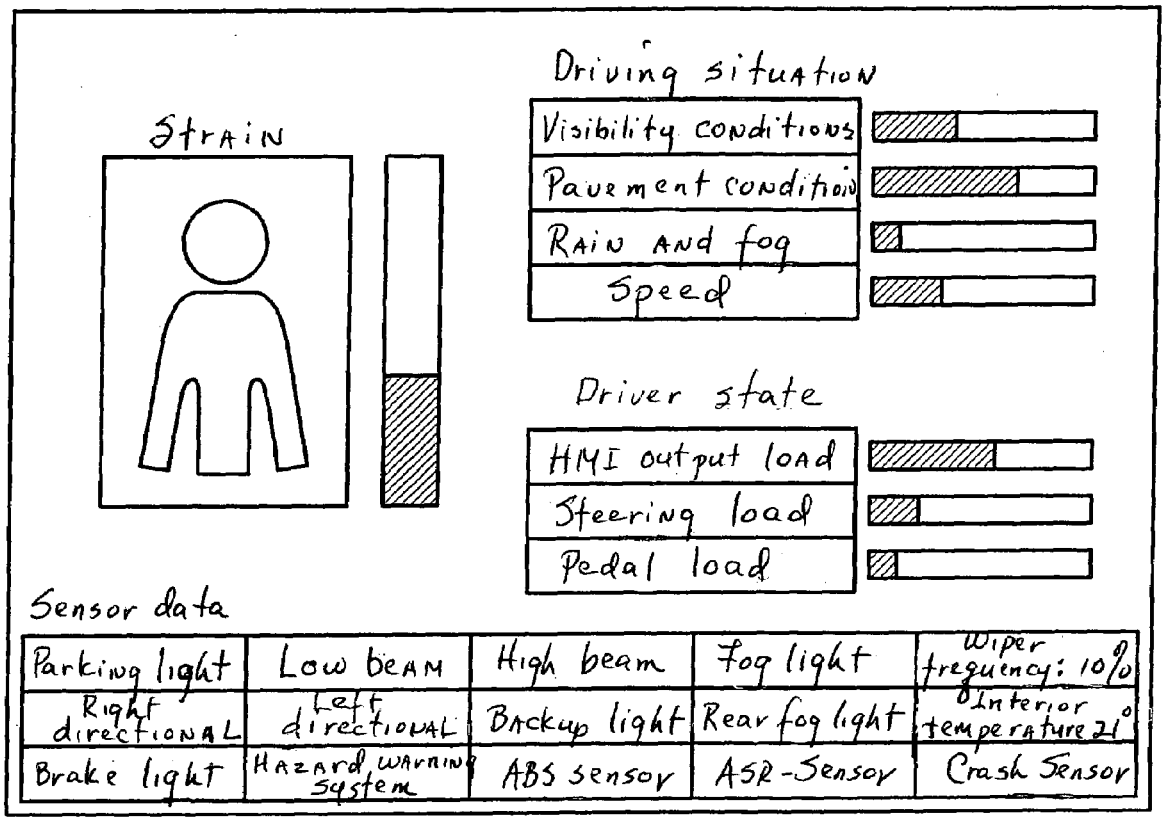
FIG. 3 shows an exemplary representation of the factors influencing the driver-state determination.

FIG. 1 shows two data buses 1 and 2, of which one may be configured as a CAN bus, for example, via which vehicle operating data and sensor data is transmitted to an evaluation device 3, in which the transmitted sensor or operating data is evaluated. A driver state detection and a driving situation detection are performed in a first step 4 on the basis of the transmitted data, this being performed on the basis of an algorithm database stored in a unit 40 and containing the rules for a corresponding evaluation of the driving situation.

The driver state, the value of which is supplied to a context database 6, is determined in a next module 5, taking the driver profile stored in a further database module 50 as a basis. Assistance systems 7, 7', 7", which are present in the vehicle, may access this context database 6, and assistance systems 7, 7', 7" are activated, partially activated, suppressed, or behaviorally altered in accordance with the determined driver state.

The driver state detection is accordingly performed in device 3, which is configured as a software module able to access various data. This includes vehicle operating data, such as speed, position of light switches, steering wheel and pedal positions, as well as the frequency of control element operation. Furthermore, situation-specific information, such as outside temperature, time, or weather influences, may be supplied to the software module. The driver state detection as well as the driving situation detection are performed in cooperation with the rules stored in database unit 40, the extent of the concentration demand on the driver at the present time being determined on the basis of specific queries. For example, use of the fog lights indicates poor visibility conditions, which increases the concentration demand on the driver. Given a high wiper frequency, a slippery driving surface as well as poor visibility conditions are assumed so that minimal distraction of the driver by low-priority information is also necessary. High intensity and frequency of gas and brake pedal operation point to increased traffic density so that increased demands are placed on the driver's concentration also in this instance. Otherwise, under consideration of the input time, a uniform speed, and a dry driving surface determined by moisture sensors, a driving situation requiring less concentration may be assumed so that information from assistance systems 7, 7', 7" may be provided to the driver without restriction.

Since situations affect each person differently, consideration of a driver profile stored in the database module 50 is provided in a second step 5. The driver profile includes numerical values that specify the extent to which a driving situation affects a particular driver. For example, older individuals have greater difficulty driving in the dark than younger individuals; the same is also true with regard to a decreased reaction time and endurance during longer trips. However, there may also be significant variations within the age groups with respect to the effect of different situations on a particular driver so that individual adaptation of the driver profile is advantageous. A determination of the overall strain on the driver is subsequently made based on the number of individual strains in connection with the driver profile, the determined value for the driver state being stored in a context database 6.

All relevant assistance systems 7, 7', 7", which are activated or deactivated according to the driver state, access this context database 6. Different systems 7, 7', 7" may be activated as a function of the data entered; for example, acoustic information may be completely dispensed with in the case of measured loud external noises or displays may be displayed at an accordingly lower light intensity in the dark provided that they are displayed.

One possible scenario of the sequence of operations provides for good weather and open roads at the start of a trip. The system detects a lower concentration demand on the driver on the basis of the operating data transmitted to it via data buses 1, 2. After a while it starts to rain and the driver sets the wiper frequency to a medium speed, so that the system determines an increased strain due to poor visibility conditions. During the further course of the drive, traffic becomes more dense, i.e., the driver must correct the distance from the preceding vehicle more regularly by braking and accelerating frequently. As a result, the system deduces an increase in traffic density, a significant strain on the driver from the driving task being determined due to the increased frequency of brake and gas pedal operation. The driver state detection yields a high strain value so that assistance systems 7, 7', 7", which take the driver state into consideration, accordingly adapt their modes of operation by suppressing unimportant messages and thereby preventing distraction of the driver.

FIG. 2 shows the flow of the driver state detection, the sensor and operating data being recorded in first step 10. In subsequent step 11, the rules for detecting the driving situation are taken from database 40 and applied. The driving situations are subsequently evaluated in step 12 under consideration of the driver profile, the overall driver strain resulting in step 13 from the evaluated driving situations. The sensor and operating data from step 10, the driving situations from step 11 and step 12, and the overall strain from step 13 are subsequently stored in context database 6 in step 14. All data stored in the context database is called up in step 15 by respective assistance system 7, 7', 7" in accordance with FIG. 1, and the information is output accordingly to the driver.

FIG. 3 shows an exemplary representation of the driving situations, the driver state, as well as the sensor data, the driving situations being determined by visibility conditions, pavement condition, weather conditions, and speeds. The driver state is determined from the HMI output load, the steering load, and the pedal load, and, in particular, vehicle operating data with respect to switched-on units, such as lights, wipers, driving direction display, ABS sensor, driving stability sensors, or temperatures, is available as sensor data. The total strain is calculated from this data and represents a measure for which data is to be provided to the driver and how and when it is to be provided.

One advantage of the method according to the present invention is that vehicle operating data and a driver profile are used to derive a hypothesis about the level of strain on the driver and that the determined strain level may be used as a basis for structuring the mode of operation of driving information systems in a situation-specific manner. The driver information systems are able to adapt their information density, their information type, or their information representation to the strain as well as to suppress information output or automatically provide assistance at a critical moment. This increases driving safety since the driver is able to concentrate more on the actual driving task in critical situations and is not distracted.

A further advantage of the present invention is that instead of direct measurements of the driver, operating data may be used to make conclusions regarding the driver state. Determinations are able to be made about the strain level of the driver on the basis of driver activities, vehicle data, and additional periphery data acquired by sensors, assistance systems 7, 7', 7" being accordingly controlled or selected on this basis. In addition, vehicle operation is simplified since assistance systems 7, 7', 7" are automatically switched on or off on the basis of the driving situation and driver state so that assistance systems 7, 7', 7" make virtually independent decisions. Adaptation of the information density of HMI outputs to the current situation is also facilitated, thereby decreasing the overall strain on the driver from the incoming information.

The present invention provides for the consideration of the driver profile, and as such the driver state detection by the system is able to be adapted to the user, in that conclusions are made based on driving style and the present driving situation. Noticeable variations in driving style during a certain state of operating and sensor data may indicate an increased or reduced strain. A particularly slow driving style during rain may indicate a certain uncertainty on the part of the driver so that an increased strain may be deduced in this instance. If the system measures significant rainfall, for example, on the basis of the wiper frequency, the information density is advantageously reduced for a corresponding driver profile so that only the most important information is provided to the driver while driving in the rain. Constant updating of the driver profile allows conclusions to be made about changes in the driver's ability or also about a deterioration in health conditions so that the information density is always automatically adapted.

Furthermore, data transmitted via external services to the vehicle, may be added to the determination of the driver strain or the driver state; traffic and traffic jam information is able to be consequently included in the calculation of the driver state. The predicted driver strain may also be determined on the basis of the map or navigation data, the driver's location, i.e., an urban or rural setting, playing a major role with respect to the expected strain.

What is claimed is:

1. A method for operating at least one information system for a driver in a motor vehicle, comprising:
   obtaining vehicle operating data;
   creating a driver profile with regard to information absorption capacity; and
   outputting, as a function of the driver profile, selected information to the driver, wherein the information output to the driver is selected as a function of vehicle operating data, whereby the selected information is adapted to a driving situation.

2. The method as recited in claim 1, wherein the selection of the information is made with respect to one of information type, information representation, and information density.

3. The method as recited in claim 1, wherein physiological data including at least one of age, body size, weight, sight capability, and reaction time, are included in the driver profile.

4. The method as recited in claim 2, wherein physiological data including at least one of age, body size, weight, sight capability, and reaction time, are included in the driver profile.

5. The method as recited in claim 2, wherein the driver profile is automatically updated over an operating period on the basis of the vehicle operating data.

6. The method as recited in claim 3, wherein the driver profile is automatically updated over an operating period on the basis of the vehicle operating data.

7. The method as recited in claim 1, wherein the information is selected on the basis of at least one of location data, time data, environmental data, and navigation data.

8. The method as recited in claim 2, wherein the information is selected on the basis of at least one of location data, time data, environmental data, and navigation data.

9. The method as recited in claim 4, wherein the information is selected on the basis of at least one of location data, time data, environmental data, and navigation data.

10. The method as recited in claim 5, wherein the information is selected on the basis of at least one of location data, time data, environmental data, and navigation data.

11. The method as recited in claim 1, wherein the information is selected on the basis of traffic data.

12. The method as recited in claim 2, wherein the information is selected on the basis of traffic data.

13. The method as recited in claim 4, wherein the information is selected on the basis of traffic data.

14. The method as recited in claim 1, wherein the vehicle operating data is recorded by sensors.

15. The method as recited in claim 1, wherein a value for a driver state is determined from the vehicle operating data and the driver profile, and wherein the driver state value is stored in a context database that is connected to at least one assistance system, the at least one assistance system one of outputting and suppressing information as a function of the driver state.

16. The method as recited in claim 4, wherein a value for a driver state is determined from the vehicle operating data and the driver profile, and wherein the driver state value is stored in a context database that is connected to at least one assistance system, the at least one assistance system one of outputting and suppressing information as a function of the driver state.

17. The method as recited in claim 6, wherein a value for a driver state is determined from the vehicle operating data and the driver profile, and wherein the driver state value is stored in a context database that is connected to at least one assistance system, the at least one assistance system one of outputting and suppressing information as a function of the driver state.

18. A system for providing a driver of a motor vehicle with information, comprising:
   an evaluation device for evaluating vehicle operating data;
   a unit for determining a value of a driver state based on the vehicle operating data and a driver profile with regard to information absorption capacity; and
   at least one driver assistance unit for selectively outputting information depending on the value of the driver state.

* * * * *